US009960666B2

(12) United States Patent
Zhao et al.

(10) Patent No.: US 9,960,666 B2
(45) Date of Patent: May 1, 2018

(54) FOUR-PORT POWER ELECTRONIC TRANSFORMER BASED ON HYBRID MODULAR MULTILEVEL CONVERTER

(71) Applicant: Southeast University, Jiangsu (CN)

(72) Inventors: Jianfeng Zhao, Jiangsu (CN); Dongye Li, Jiangsu (CN); Zhendong Ji, Jiangsu (CN); Yichao Sun, Jiangsu (CN)

(73) Assignee: Southeast University, Jiangsu (CN)

( * ) Notice: Subject to any disclaimer, the term of this patent is extended or adjusted under 35 U.S.C. 154(b) by 0 days. days.

(21) Appl. No.: 15/520,420

(22) PCT Filed: Mar. 16, 2016

(86) PCT No.: PCT/CN2016/076496
§ 371 (c)(1),
(2) Date: Apr. 20, 2017

(87) PCT Pub. No.: WO2017/128499
PCT Pub. Date: Aug. 3, 2017

(65) Prior Publication Data
US 2018/0091037 A1    Mar. 29, 2018

(30) Foreign Application Priority Data

Jan. 27, 2016   (CN) .......................... 2016 1 0057330

(51) Int. Cl.
*H02M 1/32*     (2007.01)
*H02M 3/335*   (2006.01)
(Continued)

(52) U.S. Cl.
CPC ............... *H02M 1/32* (2013.01); *H02M 1/10* (2013.01); *H02M 3/33592* (2013.01);
(Continued)

(58) Field of Classification Search
CPC ............ H02M 1/32; H02M 1/10; H02M 1/12; H02M 1/14; H02M 3/325; H02M 3/335;
(Continued)

(56) References Cited

U.S. PATENT DOCUMENTS 5,892,674 A * 4/1999 Shimada ............... H02M 7/219
363/127
8,619,446 B2 * 12/2013 Liu ......................... H02M 1/12
363/71
(Continued)

FOREIGN PATENT DOCUMENTS

| CN | 103208929 | 7/2013 |
| CN | 103731059 | 4/2014 |

(Continued)

*Primary Examiner* — Adolf Berhane
(74) *Attorney, Agent, or Firm* — JCIPRNET (57) ABSTRACT

Disclosed in the present invention is a four-port power electronic transformer based on a hybrid modular multilevel converter (MMCs). The four-port power electronic transformer includes a hybrid MMC, direct current (DC)/DC converters, and an inverter. Each DC/DC converter includes a front stage part, a high frequency transformation part and a back stage part. Compared with an existing power electronic transformer, the present invention has the following characteristics: an MMC module and a front stage of a DC/DC circuit connected to the MMC module jointly complete DC fault ride-through, and the number of adopted devices is small; the MMC module controls a DC voltage and the DC/DC circuit controls power; voltages of one or two capacitors in the module can be controlled independently or simultaneously; and the four-port power electronic transformer has four ports: a high-voltage DC port, a high-voltage alternating current (AC) port, a low-voltage DC port, and a low-voltage AC port, and is applicable to a high-voltage high-power scenario with multiple voltage (Continued)

types and levels, particularly to the energy internet to be used as an energy router and the like.

6 Claims, 8 Drawing Sheets

(51) Int. Cl.
    *H02M 7/5387*     (2007.01)
    *H02M 5/458*     (2006.01)
    *H02M 1/10*     (2006.01)
    *H02M 1/00*     (2006.01)

(52) U.S. Cl.
    CPC ....... *H02M 5/4585* (2013.01); *H02M 7/5387* (2013.01); *H02M 2001/007* (2013.01); *H02M 2001/325* (2013.01)

(58) Field of Classification Search
    CPC ........... H02M 3/33569; H02M 3/1584; H02M 3/285; H02M 3/33507; H02M 3/3155; H02M 5/40; H02M 5/42; H02M 5/453; H02M 5/45; H02M 7/5387; H02H 7/122
    USPC ..... 363/16, 17, 34, 37, 40, 55, 56.01, 56.02, 363/65, 71, 95, 97, 131, 132
    See application file for complete search history.

(56) References Cited

U.S. PATENT DOCUMENTS

| | | | |
|---|---|---|---|
| 8,934,268 B2* | 1/2015 | Trainer | H02J 3/36 323/205 |
| 8,982,593 B2* | 3/2015 | Nondahl | H02M 1/12 363/36 |
| 2005/0111246 A1* | 5/2005 | Lai | H02M 5/225 363/157 |
| 2014/0247629 A1* | 9/2014 | Crane | H02J 3/36 363/35 |
| 2014/0254205 A1* | 9/2014 | Trainer | H02M 3/335 363/17 |
| 2015/0333653 A1* | 11/2015 | Choi | H02M 5/458 363/37 |
| 2016/0313387 A1* | 10/2016 | Schweizer | H02M 1/088 |
| 2017/0214335 A1* | 7/2017 | Basic | H02M 7/48 |
| 2017/0358999 A1* | 12/2017 | Geske | H02M 7/5387 |
| 2018/0015831 A1* | 1/2018 | Rozman | B60L 11/02 |

FOREIGN PATENT DOCUMENTS

| | | |
|---|---|---|
| CN | 104078994 | 10/2014 |
| CN | 104821736 | 8/2015 |
| WO | 2014154241 | 10/2014 |

* cited by examiner

FOUR-PORT POWER ELECTRONIC TRANSFORMER BASED ON HYBRID MODULAR MULTILEVEL CONVERTER

CROSS-REFERENCE TO RELATED APPLICATION

This application is a 371 application of the International PCT application serial no. PCT/CN2016/076496, filed on Mar. 16, 2016, which claims the priority benefit of China application no. 201610057330.3, filed on Jan. 27, 2016. The entirety of each of the above-mentioned patent applications is hereby incorporated by reference herein and made a part of this specification.

BACKGROUND OF THE INVENTION

Field of the Invention

The present invention relates to a four-port power electronic transformer based on a hybrid modular multilevel converter.

Description of Related Art

In a traditional multilevel topological structure, for example, an H-bridge cascaded power electronic transformer, because the H-bridge cascaded structure does not have a high-voltage direct-current (DC) side, the power electronic transformer also does not have a high-voltage DC port. However, with the continuously increasing requirements for power and energy, more efficient and energy-saving electricity transmission and consumption technologies become an important direction of the current power technology improvements, so that fields such as high-voltage DC transmission, a DC distribution network, and a microgrid are gradually put into research perspective. Therefore, related technologies such as a modular multilevel converter (MMC) emerge, which makes high-voltage DC related applications achievable and applicable and better meets the development of the DC related technologies. A power electronic transformer based on an MMC has a high-voltage DC port, so that the transformer is enabled to be directly connected to a high-voltage DC grid. However, the common MMC-type power electronic transformer based on a half-bridge module does not have a DC fault ride-through capability, adopts many devices, and has a high cost. Therefore, it is very necessary to improve the module. If the module is not improved, the power electronic transformer has low reliability and is difficultly applicable to an actual engineering application.

SUMMARY OF THE INVENTION

Technical Problem

The technical problems to be solved in the present invention are that, an existing power electronic transformer has a complex structure, a high cost, a high harmonic content, and a poor use effect and cannot satisfy application requirements in a multi-power supply scenario.

Technical Solution

In order to solve the foregoing problems, the technical solution adopted in the present invention is a four-port power electronic transformer based on a hybrid MMC, including a hybrid MMC, DC/DC converters, and an inverter, where the DC/DC converter includes a front stage part, a high frequency transformation part, a back stage part, where an alternating current (AC) side of the front stage part is connected to a primary side of the high frequency transformation part, and a secondary side of the high frequency transformation part is connected to an AC side of the back stage part; the inverter is a three-phase four-bridge arm inverter; the MMC has three phases, each phase having two bridge arms, and each bridge arm including X first submodules, Y second submodules, and one inductor, where X+Y, N, N being the minimum number of modules required when the MMC works normally; the first submodule includes two half-bridge structures connected in series, including a DC capacitor C1, a DC capacitor C2, and four insulated gate bipolar transistors T1, T2, T3 and T4 with anti-paralleled diodes; T1, T2, T3, and T4 have collectors respectively connected to cathodes of their respective freewheeling diodes and emitters respectively connected to anodes of their respective freewheeling diodes; an emitter of T1 and a collector of T2 are connected and used as an AC port A of the first submodule, a collector of T1 and a positive electrode of C1 are connected and used as a positive electrode port C of the first submodule, an emitter of T2, a negative electrode of C1, a collector of T4, and a positive electrode of C2 are connected and used as a port I of the first submodule, an emitter of T4 and a collector of T3 are connected and used as an AC port B of the first submodule, and an emitter of T3 and a negative electrode of C2 are connected and used as a negative electrode port D of the first submodule; the positive electrode port C and the negative electrode port D of the first submodule are respectively connected to a positive electrode port and a negative electrode port of a front stage of a DC/DC converter connected to a DC side of the module; the second submodule includes a DC capacitor C3, a DC capacitor C4, and five insulated gate bipolar transistors T5, T6, T7, T8, and T9 with anti-paralleled diodes; T5, T6, T7, T8, and T9 have collectors respectively connected to cathodes of their respective freewheeling diodes and emitters respectively connected to anodes of their respective freewheeling diodes; in the second submodule, an emitter of T5 and a collector of T6 are connected and used as an AC port E of the second submodule, a collector of T5 and a positive electrode of C3 are connected and used as a positive electrode port G of the second submodule, an emitter of T6, an emitter of T9, and a negative electrode of C3 are connected, an emitter of T7 and a collector of T8 are connected and used as an AC port F of the second submodule, a collector of T7, a collector of T9, and a positive electrode of C4 are connected and used as a port J of the second submodule, and an emitter of T8 and a negative electrode of C4 are connected and used as a negative electrode port H of the second submodule; the positive electrode port G and the negative electrode port H of the second submodule are respectively connected to a positive electrode port and a negative electrode port of a front stage of a DC/DC converter connected to a DC side of the module; Without considering redundancy, X+Y=N, (2X+2Y)Vc=Vdc, and vm=(2X+2Y)Vc, where Vdc is a voltage at a high-voltage DC side, Vc is a voltage of each DC capacitor, and vm is a phase voltage amplitude at a high-voltage AC side; considering redundancy, the following relationship needs to be satisfied: X+Y≥N; when the MMC has a DC fault ride-through capability, without considering redundancy, X and Y satisfy the following relationship:

$$\frac{\sqrt{3}}{2}(2X+2Y) \le 4Y;$$

in the same phase, X first submodules, Y second submodules and an inductor are successively connected in series to form an upper bridge arm of the phase, an inductor, Y second submodules, and X first submodules are successively connected in series to form a lower bridge arm of the phase, and a connection midpoint of the upper bridge arm and the lower bridge arm in the same phase is a high-voltage AC interface of the power electronic transformer in the phase; positive electrode ends of three upper bridge arms are connected together and used as a positive electrode P of a high-voltage DC port of the power electronic transformer, negative electrode ends of three lower bridge arms are connected together and used as a negative electrode N of the high-voltage DC port of the power electronic transformer, and a DC side of each of the first submodules and the second submodules is connected to a front stage of a DC/DC converter; a DC side of each submodule of the MMC is connected to a DC/DC converter, a DC side of a front stage of each DC/DC converter is connected to a positive electrode and a negative electrode of DC capacitors connected in series in a corresponding module in the MMC, and positive electrodes and negative electrodes at DC sides of back stages of all the DC/DC converters are respectively connected in parallel and then connected to a positive electrode and a negative electrode at a DC side of the inverter.

The redundancy state means that, in the case that a normal running state is satisfied, redundant first submodules or second submodules are disposed, to replace a used first submodule or second submodule in time when the used first submodule or second submodule is faulty, where the redundant first submodule can replace a faulty first submodule and the redundant second submodule can replace a faulty first or second submodule.

Further, the high frequency transformation part of the DC/DC converter is a high frequency transformer T, and the back stage part consists of an H-bridge circuit and a DC capacitor.

Further, the front stage part of the DC/DC converter is of a full-bridge structure, and the port I of the first submodule and the port J of the second submodule are not used.

Further, the front stage part of the DC/DC converter is of an improved diode clamping structure, including five insulated gate bipolar transistors T10, T11, T12, T13, and T14 with anti-paralleled diodes and two diodes D1 and D2, where a collector of T10 is connected to the port C of the first submodule or the port G of the second submodule, an emitter of T10 and a cathode of D1 are connected to a collector of T11, an anode of D1, an emitter of T14, a cathode of D2 are connected to one end of the transformer T, a collector of T14 is connected to the port I of the first submodule or the port J of the second submodule, an emitter of T11 is connected to a collector of T12 and the other end of the high frequency transformer T, an emitter of T12 is connected to an anode of D2 and a collector of T13, and an emitter of T13 is connected to the port D of the first submodule or the port H of the second submodule, where T14 is in a turn-on state all the time when the power electronic transformer works normally, and when a DC fault occurs at a high-voltage side of the power electronic transformer, a trigger signal for T14 is blocked; the insulated gate bipolar transistors T10, T11, T12, T13, and T14 with anti-paralleled diodes have the collectors respectively connected to cathodes of their respective freewheeling diodes and the emitters respectively connected to anodes of their respective freewheeling diodes.

Further, the front stage part of the DC/DC converter is of an improved T-type three-level structure, including three insulated gate bipolar transistors T15, T16, and T19 with anti-paralleled diodes and one reverse blocking insulated gate bipolar transistor consisting of T17 and T18, where a collector of T15 is connected to the port C of the first submodule or the port G of the second submodule, an emitter of T15, a collector of T16, a collector of T17, and an emitter of T18 are connected to one end of the high frequency transformer T, an emitter of T17, a collector of T18, and an emitter of T19 are connected to the other end of the high frequency transformer T, a collector of T19 is connected to the port I of the first submodule or the port J of the second submodule, and an emitter of T16 is connected to the port D of the first submodule or the port H of the second submodule; the insulated gate bipolar transistors T15, T16, T17, T18, and T19 with anti-paralleled diodes have the collectors respectively connected to cathodes of their respective freewheeling diodes and the emitters respectively connected to anodes of their respective freewheeling diodes; T19 is in a turn-on state all the time when the power electronic transformer works normally, and when a DC fault occurs at a high-voltage side, a trigger signal for T19 is blocked.

Further, a modulation ratio m of the MMC satisfies the following relationships: m≤2 and m=2Vm/Vdc. The advantage of setting m to this value is that, charging and discharging time of the first submodule can satisfy the requirement of voltage balance.

Advantageous Effects

The advantages of the present invention are that, apart from the functions and advantages of the traditional power electronic transformer based on a hybrid MMC, compared with the design solutions currently provided at home and abroad, the four-port power electronic transformer based on a hybrid MMC of the present invention has the following functions and characteristics:

1. The four-port power electronic transformer based on a hybrid MMC of the present invention has four ports: a high-voltage DC port, a high-voltage AC port, a low-voltage DC port, and a low-voltage AC port, where the high-voltage DC port that the conventional power electronic transformer does not have can enable the power electronic transformer to be directly connected to a high-voltage DC power grid, such that the power electronic transformer is adapted to development and construction of a high-voltage DC transmission and distribution network, a microgrid, and an energy internet and is applicable to a high-voltage high-power scenario with multiple voltage types and levels.

2. The four-port power electronic transformer based on a hybrid MMC of the present invention can achieve an adjustment and fault ride-through capability by changing the number of used first submodules and second submodules, where a larger number of second submodules can achieve a greater DC fault ride-through capability, when a short fault occurs at a high-voltage DC side, only trigger signals for all the insulated gate bipolar transistors and the reverse blocking insulated gate bipolar transistor need to be blocked, and the second submodule in the MMC and a front stage of a DC/DC circuit connected to the second submodule jointly complete DC fault ride-through, such that a small number of devices need to be used, thereby taking full use of a switch device and saving the hardware cost, so the four-port power electronic transformer based on a hybrid MMC of the present invention is simple and safe to control and can adapt to requirements of different application scenarios.

3. The four-port power electronic transformer based on a hybrid MMC of the present invention can directly use all modulation and control methods of the traditional MMC, as long as insulated gate bipolar transistor T9 in all the second submodules are turned on during normal work and a trigger signal is blocked when a short fault occurs; voltages of two DC capacitors in the first submodule and the second submodule may be controlled simultaneously or separately, such that multiple modulation and voltage balance policies can be selected, so the four-port power electronic transformer based on a hybrid MMC of the present invention can be applicable to different application scenarios.

4. In the four-port power electronic transformer based on a hybrid MMC of the present invention, the DC/DC converter is connected to two DC capacitors in the first submodule and the second submodule, thereby reducing the number of required DC/DC converters, reducing the number of used devices, and reducing the control complexity.

5. In the four-port power electronic transformer based on a hybrid MMC of the present invention, the first submodules and the second submodules control the voltages of the capacitors and the DC/DC converters control power, that is, the voltage control function is separated from the power control function, so that the control is easy to implement.

6. In the four-port power electronic transformer based on a hybrid MMC of the present invention, when a DC short fault occurs, after all switch devices are blocked, when a current of each bridge arm flows into the second submodule in a forward direction, the current flows through the anti-paralleled diode of T9, and after a current of each bridge arm flows into the second submodule in a reverse direction, the current flows through a diode of a switch device of the front stage of the DC/DC module, thereby clearing the fault, taking full use of the switch device, and saving the hardware cost.

7. In the four-port power electronic transformer based on a hybrid MMC of the present invention, the following three solutions are provided for the front stage of the DC/DC converter: an H-bridge structure, a diode clamping structure, and a T-type three-level circuit, so that more choices are provided according to different requirements for engineering practices, and compared with the solution of the existing power electronic transformer, the four-port power electronic transformer based on a hybrid MMC of the present invention has the advantages of improving the output waveform quality, reducing the on-state loss, and increasing the DC voltage utilization ratio.

In the figures: DC capacitors C1 and C2 in the first submodule, insulated gate bipolar transistors T1, T2, T3, and T4 with anti-paralleled diodes, an AC port A in the first submodule, an AC port B in the first submodule, a positive electrode port C in the first submodule, a negative electrode port D in the first submodule, a port I in the first submodule, DC capacitors C3 and C4 in the second submodule, insulated gate bipolar transistors T5, T6, T7, T8, and T9 with anti-paralleled diodes, an AC port E in the second submodule, an AC port F in the second submodule, a positive electrode port G in the second submodule, a negative electrode port H in the second submodule, a port J in the second submodule, the number X of first submodules included in each bridge arm, the number Y of second submodules included in each bridge arm, an inductor Lap of an a-phase upper bridge arm, an inductor Lan of an a-phase lower bridge arm, an inductor Lbp of a b-phase upper bridge arm, an inductor Lbn of a b-phase lower bridge arm, an inductor Lcp of a c-phase upper bridge arm, an inductor Lcn of a c-phase lower bridge arm, a positive electrode P at a common DC bus side, a negative electrode N at the common DC bus side, an A-phase port a at an AC side, a B-phase port b at the AC side, a C-phase port c at the AC side, a low-voltage DC positive electrode port K, a low-voltage DC negative electrode port L, four insulated gate bipolar transistors T10, T11, T12, and T13 with anti-paralleled diodes and two diodes D1 and D2 in the second solution of the DC/DC front stage part, two insulated gate bipolar transistors T14 and T15 with anti-paralleled diodes and one reverse blocking insulated gate bipolar transistor T16 (T17) in the third solution, and a high frequency transformer T.

DETAILED DESCRIPTION OF THE INVENTION

The technical solution of the present invention is described below in detail, but the protection scope of the present invention is not limited to the embodiments.

Embodiment

As shown in FIG. 1A to FIG. 3, a four-port power electronic transformer based on a hybrid modular multilevel converter (MMC) of the present invention includes a hybrid MMC 1, DC/DC converter 2, and an inverter 3. A DC side of each submodule of the MMC is connected to a DC/DC converter 2. A DC side of a front stage of each DC/DC converter is connected to a positive electrode and a negative electrode of DC capacitors connected in series in a corresponding module in the MMC. Positive electrodes and negative electrodes at DC sides of back stages of all of the DC/DC converters are connected in parallel respectively and then connected to a positive electrode and a negative electrode at a DC side of the inverter. The inverter 3 is a three-phase four-bridge arm inverter.

Figure 2:
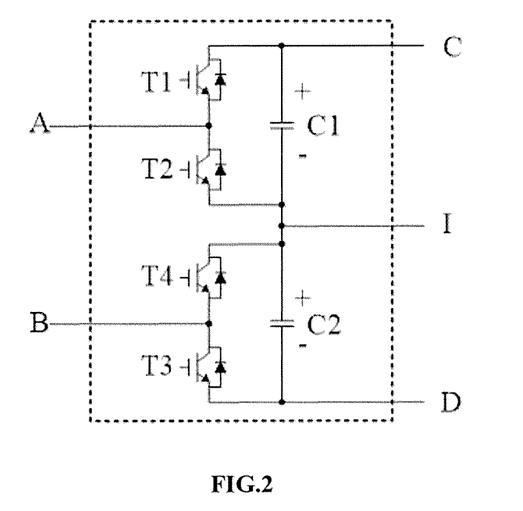
FIG. 2 is a functional block diagram of a first submodule.
Figure 3:
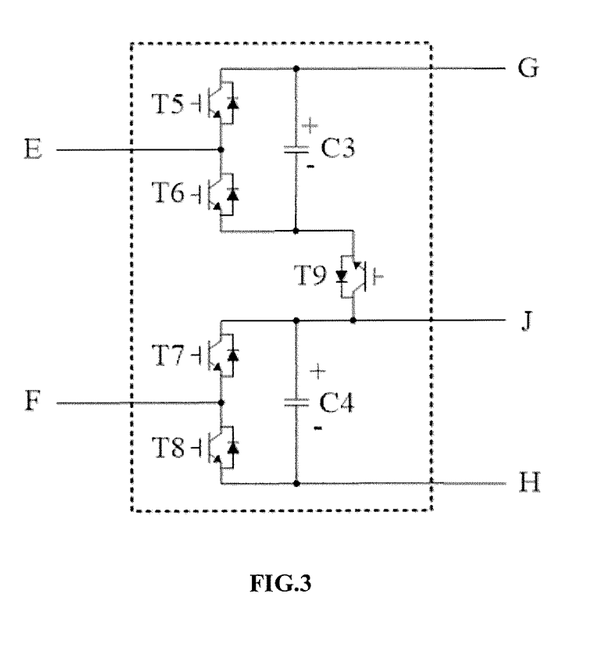
FIG. 3 is a functional block diagram of a second submodule.

Two kinds of submodules exist in the MMC of the present invention: a first submodule 110 and a second submodule 120. With reference to FIG. 2, the first submodule includes a DC capacitor C1, a DC capacitor C2, and four insulated gate bipolar transistors T1, T2, T3 and T4 with anti-paralleled diodes. With reference to FIG. 3, the second submodule includes a DC capacitor C3, a DC capacitor C4, and five insulated gate bipolar transistors T5, T6, T7, T8, and T9 with anti-paralleled diodes. The insulated gate bipolar transistors T1, T2, T3, T4, T5, T6, T7, T8, and T9 with anti-paralleled diodes have collectors respectively connected to cathodes of their respective freewheeling diodes and emitters respectively connected to anodes of their respective freewheeling diodes. The first submodule 110 is formed of two half-bridge structures connected in series, that is, an emitter of T1 and a collector of T2 are connected and used as an AC port A of the first submodule 110, a collector of T1 and a positive electrode of C1 are connected and used as a positive electrode port C of the first submodule 110, an emitter of T2, a negative electrode of C1, a collector of T4, and a positive electrode of C2 are connected and used as a port I of the first submodule 110, an emitter of T4 and a collector of T3 are connected and used as an AC port B of the first submodule 110 and an emitter of T3 and a negative electrode of C2 are connected and used as a negative electrode port D of the first submodule 110. The positive electrode port C and the negative electrode port D of the first submodule 110 are respectively connected to a positive electrode port and a negative electrode port of a front stage 210 of a DC/DC converter 2 connected to a DC side of the module 100. In the second submodule 120, an emitter of T5 and a collector of T6 are connected and used as an AC port E of the second submodule 120, a collector of T5 and a positive electrode of C3 are connected and used as a positive electrode port G of the second submodule 120, an emitter of T6, an emitter of T9, and a negative electrode of C3 are connected, an emitter of T7 and a collector of T8 are connected and used as an AC port F of the second submodule 120, a collector of T7, a collector of T9, and a positive electrode of C4 are connected and used as a port J of the second submodule, and an emitter of T8 and a negative electrode of C4 are connected and used as a negative electrode port H of the second submodule 120. The positive electrode port G and the negative electrode port H of the second submodule 120 are respectively connected to a positive electrode port and a negative electrode port of a front stage 210 of a DC/DC converter 2 connected to a DC side of the module. The MMC 1 includes two kinds of modules 100 and six inductors, where the inductors are Lap, Lan, Lbp, Lbn, Lcp, and Lcn. X first submodules, Y second submodules and an inductor Lap are successively connected in series to form an A-phase upper bridge arm of the MMC 1, and an inductor Lan, Y second submodules, and X first submodules are successively connected in series to form an A-phase lower bridge arm of the MMC 1; X first submodules, Y second submodules and an inductor Lbp are successively connected in series to form a B-phase upper bridge arm of the MMC 1, and an inductor Lbn, Y second submodules, and X first submodules are successively connected in series to form a B-phase lower bridge arm of the MMC 1; X first submodules, Y second submodules and an inductor Lcp are successively connected in series to form a C-phase upper bridge arm of the MMC 1, and an inductor Lcn, Y second submodules, and X first submodules are successively connected in series to form a C-phase lower bridge arm of the MMC 1. The port C and the port D of each first submodule 110 are respectively connected to a port C (G) and a port D (H) of a front stage 210 of a DC/DC converter 2 connected to a DC side of the module, and the port G and the port H of the second submodule 120 are respectively connected to a port C (G) and a port D (H) of a front stage 210 of a DC/DC converter 2 connected to a DC side of the module. Each bridge arm includes N modules. Each bridge arm includes 2N DC capacitors, X first submodules, and Y second submodules. In order to ensure normal work of the power electronic transformer without considering that the second submodule works at a negative voltage, X and Y satisfy the following relationships: X+Y=N, (2X+2Y) Vc=Vdc, and vm=(2X+2Y)Vc, where Vdc is a voltage at a high-voltage DC side, Vc is a voltage of each DC capacitor, and vm is a phase voltage amplitude at a high-voltage AC side. Considering redundancy, the following relationship needs to be satisfied: X+Y≥N.

For the four-port power electronic transformer based on a hybrid MMC, suppose DC capacitors C1, C2 (or C3, C4) in the modules 110 (or 120) have the same voltage, the MMC 1 has a DC fault ride-through capability, and without considering that the second submodule 120 works at a negative voltage and without considering redundancy, X and Y satisfy the following relationship:

$$\frac{\sqrt{3}}{2}(2X+2Y) \le 4Y.$$

When a short fault occurs at a high-voltage DC side, only trigger signals for the insulated gate bipolar transistors and a reverse blocking insulated gate bipolar transistor need to be blocked. In this case, when a current of each bridge arm flows into the second submodule 120 in a forward direction, the current flows through the anti-paralleled diode of T9, and after a current of each bridge arm flows into the second submodule 120 in a reverse direction, the current flows through an anti-paralleled diode of a switch device of the front stage 210 of the DC/DC module 2, thereby clearing the fault, taking full use of the switch device, and saving the hardware cost.

In order that charging and discharging time of the first submodule 210 can satisfy the requirement of voltage balance, a modulation ratio m of the MMC 1 satisfies the following relationships: m≤2 and m=2$v_m$/$V_{dc}$.

Figure 1A:
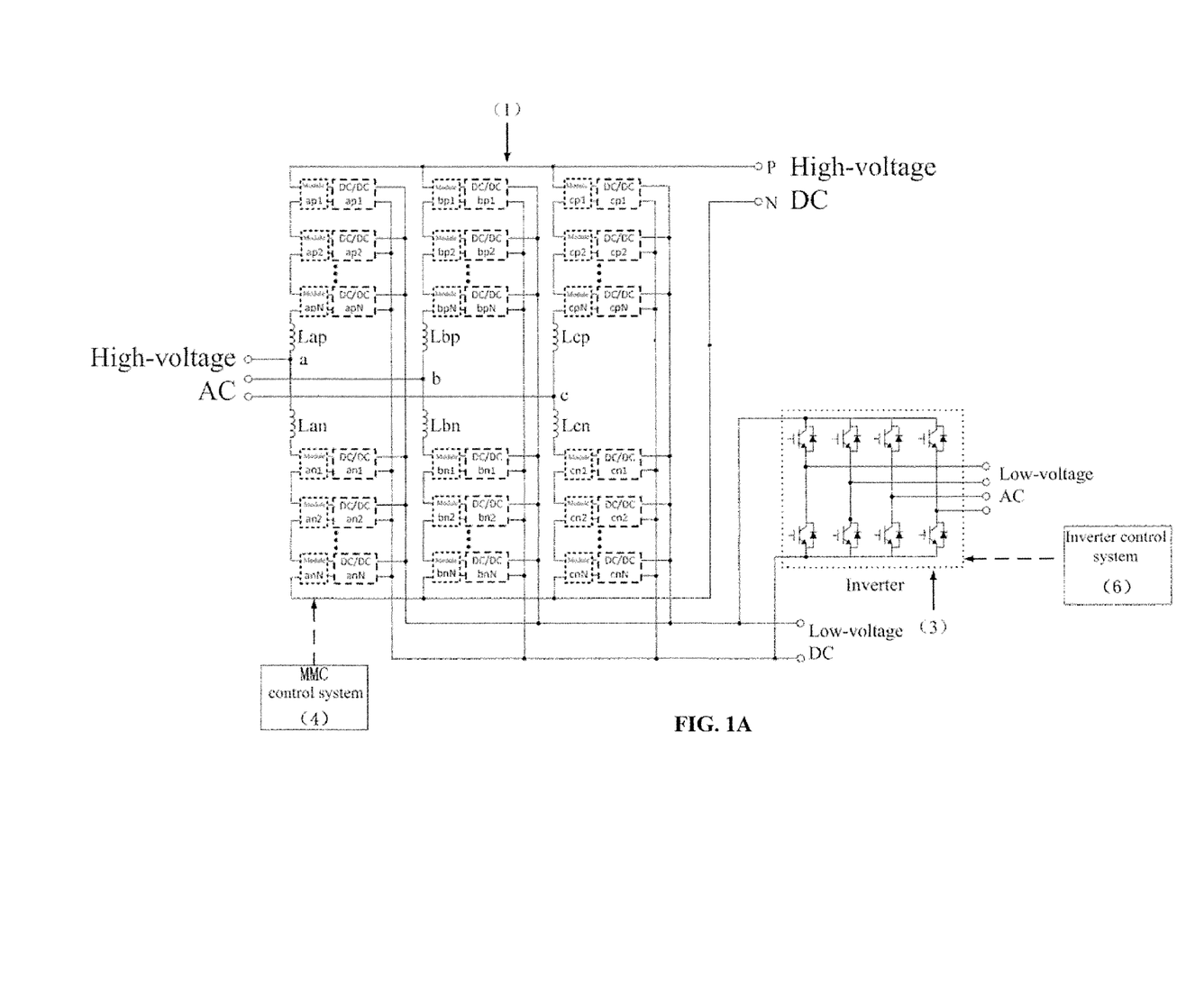
FIG. 1A is an overall functional block diagram of a four-port power electronic transformer based on a hybrid MMC.
Figure 1B:
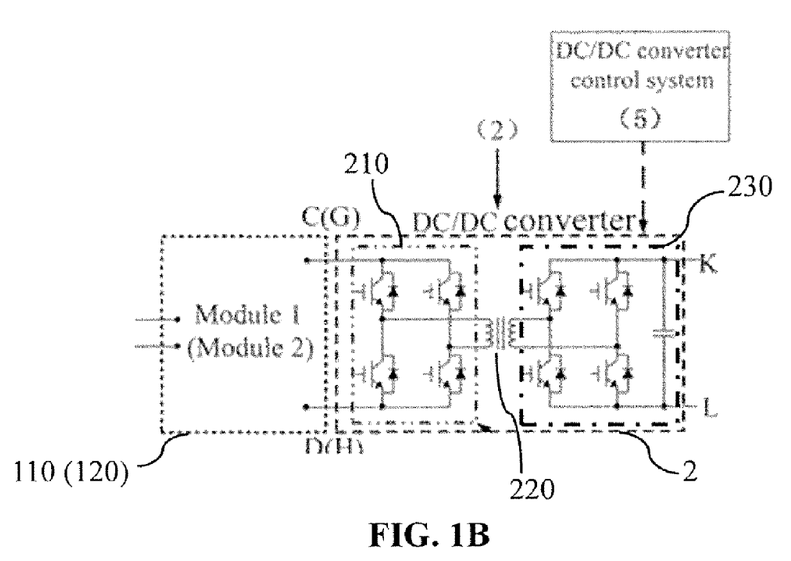
FIG. 1B is a functional block diagram of a DC/DC converter.
Figure 4:
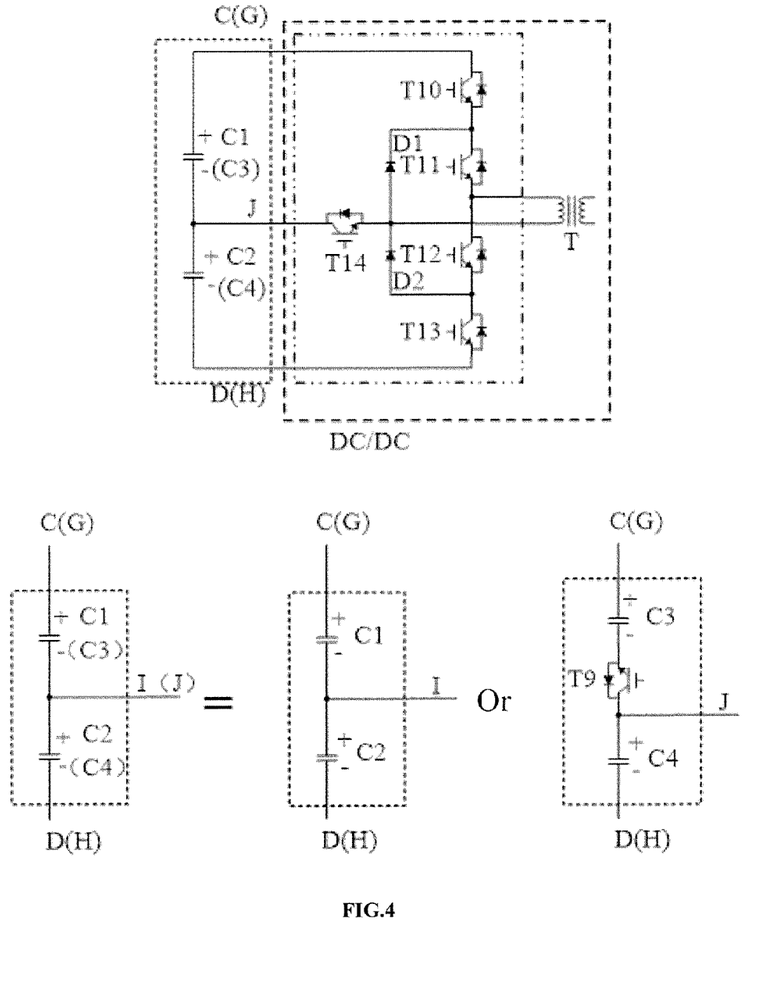
FIG. 4 is a functional block diagram of a DC/DC front stage part (solution 2).
Figure 5:
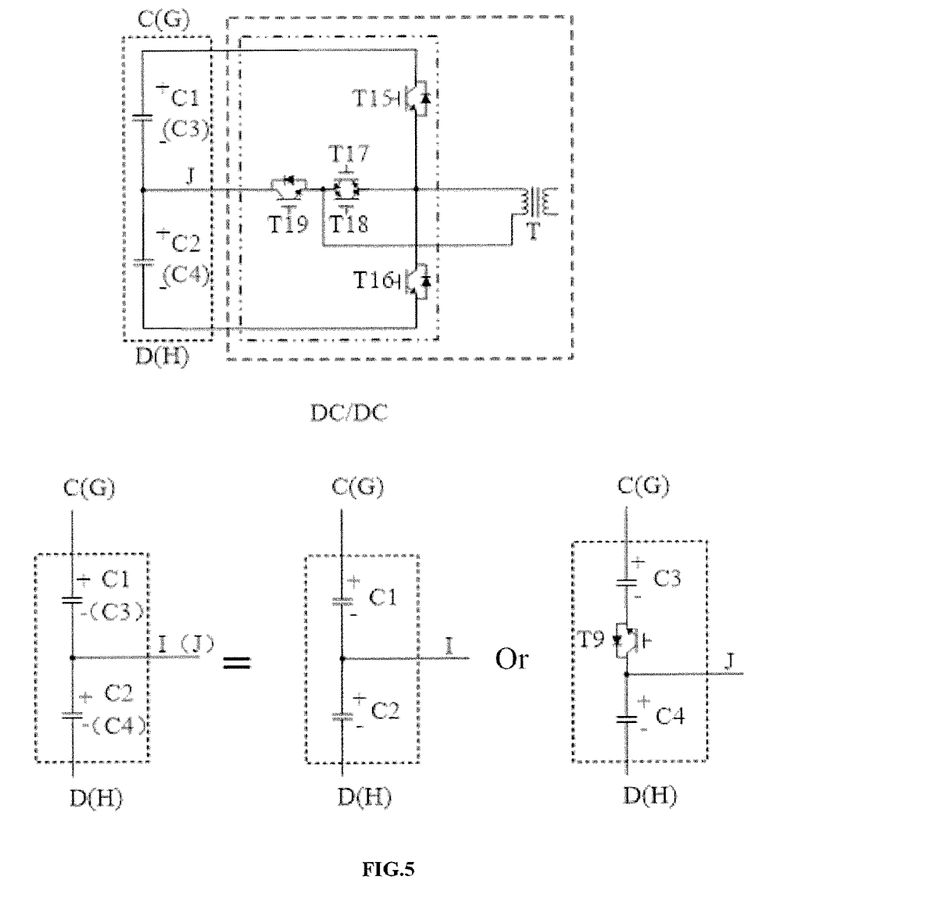
FIG. 5 is a functional block diagram of a DC/DC front stage part (solution 3).

As shown in FIG. 1B, FIG. 4 and FIG. 5, each DC/DC converter 2 of the present invention includes a front stage part 210, a high frequency transformation part 220, and a back stage part 230. Three solutions are provided for the front stage part 210 and can be selected according to the different application scenarios. The high frequency transformation part 220 is a high frequency transformer T. The back stage part 230 consists of an H-bridge circuit and a DC capacitor. In the first solution for the DC/DC front stage part 210, a full-bridge structure is adopted. In this solution, the port I of the first submodule 110 and the port J of the second submodule 120 are not used. In the second solution, an improved diode clamping structure is adopted. In the third solution, an improved T-type three-level structure. In the second solution, with reference to FIG. 4, five insulated gate bipolar transistors T10, T11, T12, T13, and T14 with anti-paralleled diodes and two diodes D1 and D2 are included, where a collector of T10 is connected to the port C of the first submodule 110 or the port G of the second submodule 120, an emitter of T10 and a cathode of D1 are connected to a collector of T11, an anode of D1, an emitter of T14, a cathode of D2 are connected to one end of the transformer T, a collector of T14 is connected to the port I of the first submodule 110 or the port J of the second submodule 120, an emitter of T11 is connected to a collector of T12 and the other end of the high frequency transformer T, an emitter of T12 is connected to an anode of D2 and a collector of T13, and an emitter of T13 is connected to the port D of the first submodule 110 or the port H of the second submodule 120, where T14 is in a turn-on state all the time when the power electronic transformer works normally, and when a DC fault occurs at a high-voltage side, a trigger signal for T14 is blocked. In the third solution, with reference to FIG. 5, three insulated gate bipolar transistors T15, T16, and T19 with anti-paralleled diodes and one reverse blocking insulated gate bipolar transistor T17 (T18) are included, where a collector of T15 is connected to the port C of the first submodule 110 or the port G of the second submodule 120, an emitter of T15, a collector of T16, a collector of T17, and an emitter of T18 are connected to one end of the high frequency transformer T, an emitter of T17, a collector of T18, and an emitter of T19 are connected to the other end of the high frequency transformer T, a collector of T19 is connected to the port I of the first submodule 110 or the port J of the second submodule 120, and an emitter of T16 is connected to the port D of the first submodule 110 or the port H of the second submodule 120. The insulated gate bipolar transistors T10, T11, T12, T13, T14, T15, T16, and T19 with anti-paralleled diodes have collectors respectively connected to cathodes of their respective freewheeling diodes and emitters respectively connected to anodes of their respective freewheeling diodes, where T19 is in a turn-on state all the time when the power electronic transformer works normally, and when a DC fault occurs at a high-voltage side, a trigger signal for T19 is blocked.

Figure 6:
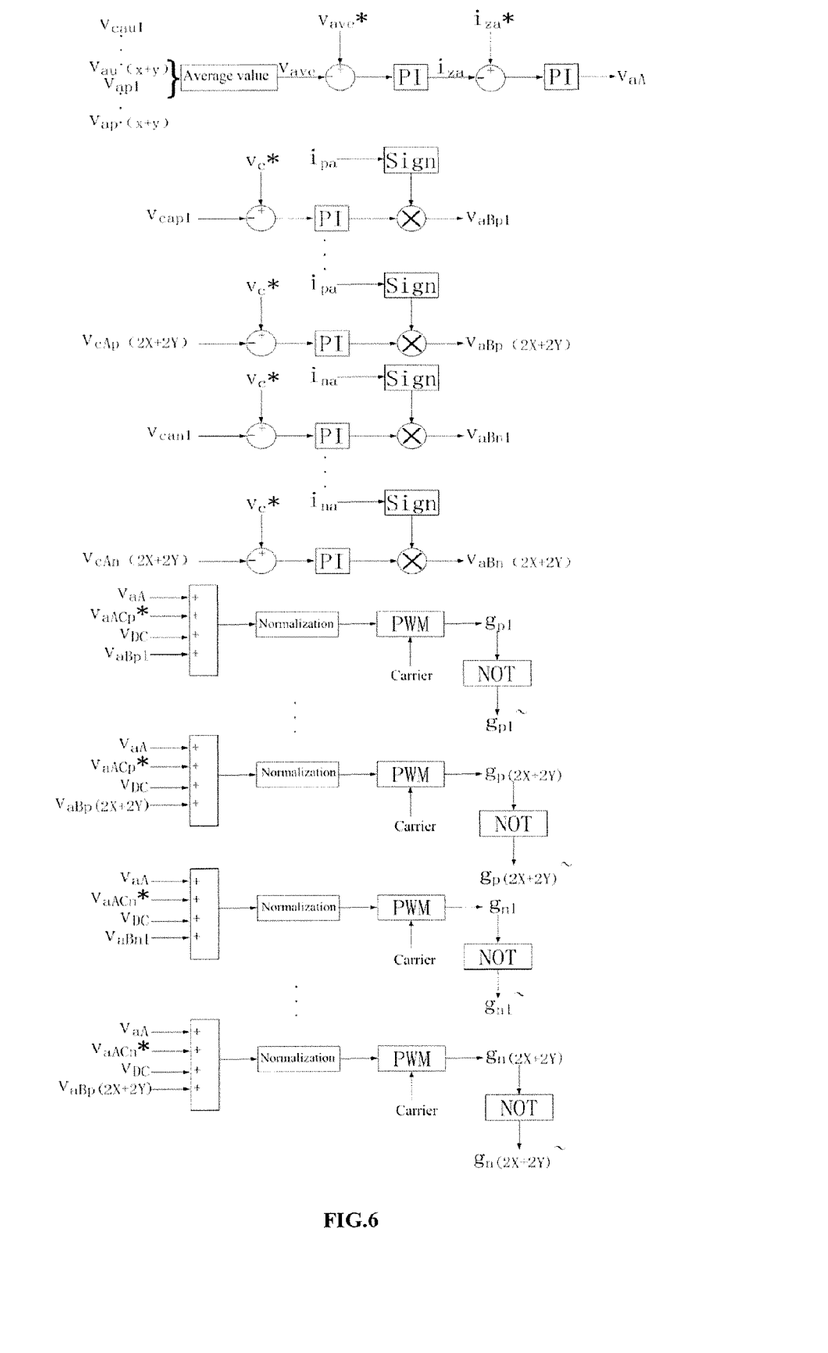
FIG. 6 is a schematic diagram of a control circuit of each phase of an MMC.

As shown in FIG. 6, in an example of controlling a voltage of a single capacitor, the MMC controls a circulating current and a modular capacitor voltage of the MMC through a circulating current suppression and modular capacitor voltage control circuit, where each phase has the same control circuit. In an example of the phase a, first, voltage values vcap1 to vap(2X+2Y) and vcan1 to van(2X+2Y) of capacitors on the phase a are measured and collected. Then, an average value vave of the voltage values is calculated. PI adjustment is performed on the average value vave in a voltage loop, obtaining an adjusted value. The adjusted value is compared with a measured circulating current iza, obtaining a difference value. PI adjustment is performed on the difference value in a current loop, obtaining an adjusted value. The adjusted value is used as a modulation signal component vaA of the average voltage. After PI adjustment is performed on a difference between an actually measured voltage value of each capacitor and a set value vc*, it is determined whether to charge or discharge the module according to a direction of a current of a bridge arm where the capacitor is located, to generate a modulation signal component, for example, a modulation component vaBp1 of the first half-bridge module in the first module. A modulation signal is generated according to vaA, vaBp1, DC and AC signal reference values of the bridge arm where the module is located, thereby generating PWM signals required by all modules.

Figure 7:
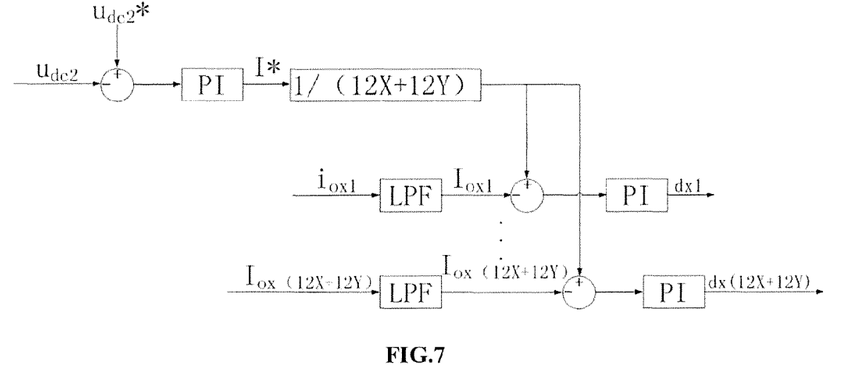
FIG. 7 is a schematic diagram of a control circuit of a DC/DC converter.

As shown in FIG. 7, the DC/DC converter is controlled by a parallel current-sharing control circuit at a DC output stage under independent stage control, where power flowing of the power electronic transformer is mainly controlled and one outer voltage loop and 12(X+Y) inner current loops are included. After PI adjustment is performed on a difference between an actual value Udc2 at a parallel output side of the DC/DC converter and an output DC voltage instruction value Udc*, an output current instruction value I* of each [[DAB]]DC/DC converter. Actual output currents iox1, . . . , iox(12X+12Y) of the DC/DC converters include high frequency components, low pass filters need to be used to filter the high frequency components, to obtain average values Iox1, . . . , Iox(12X+12Y). Finally, after PI adjustment is performed on differences between the actual average output currents and the instruction output current, phase shift ratios dx1, . . . , dx(12X+12Y) between primary modules and secondary modules of the DC/DC converters. According to different solutions of front stages of the DC/DC converters and different engineering requirements, modulation manners may be different.

Figure 8:
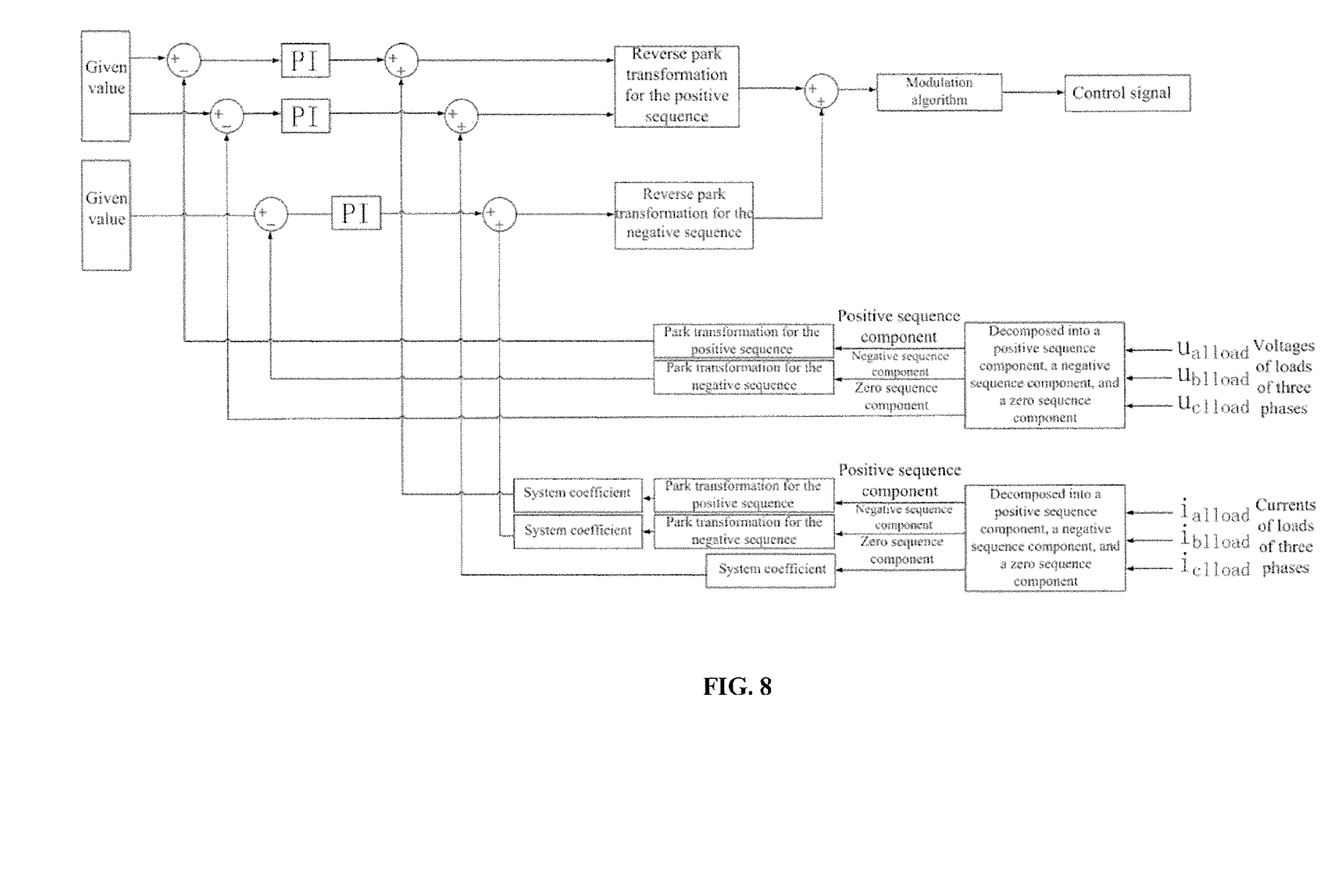
FIG. 8 is a schematic diagram of a control circuit of an inverter at a low-voltage side.

As shown in FIG. 8, the inverter at a low-voltage side of the power electronic transformer is controlled by a control circuit based on a symmetrical component method and current decoupling, where an output of a low-voltage AC port of the power electronic transformer is mainly controlled. The main work principle is as follows. A voltage and a current of a load at an AC side of the inverter at the low-voltage side are decomposed into positive sequence components, negative sequence components, and zero sequence components. Park transformation is performed on the positive sequence components and the negative sequence components of the voltage and the current, obtaining a transformed voltage and a transformed current. D and Q parts of the transformed voltage are compared with given values respectively, obtaining comparison results. PI adjustment is performed on the comparison results, obtaining adjusted values. The adjusted values are added to D and Q parts of a corresponding current respectively, obtaining addition results. Reverse park transformation for the positive sequence components and reverse park transformation for the negative sequence components are performed on the addition results, obtaining transformation results. The transformation results are added together to be used as a modulation signal.

A modulation algorithm is performed on the modulation signal to generate a drive control signal.

What is claimed is:

1. A four-port power electronic transformer based on a hybrid modular multilevel converter (MMC), comprising: a hybrid MMC, direct current (DC)/DC converters, and an inverter, wherein the DC/DC converter comprises a front stage part, a high frequency transformation part, and a back stage part, wherein an alternating current (AC) side of the front stage part is connected to a primary side of the high frequency transformation part, and a secondary side of the high frequency transformation part is connected to an AC side of the back stage part;

the inverter is a three-phase four-bridge arm inverter;

the MMC has three phases, each phase having two bridge arms, and each bridge arm comprising X first submodules, Y second submodules, and an inductor, wherein X+Y≥N, N being the minimum number of modules required when the MMC works normally;

the first submodule comprises two half-bridge structures connected in series, comprising a DC capacitor C1, a DC capacitor C2, and four insulated gate bipolar transistors T1, T2, T3 and T4 with anti-paralleled diodes;

the T1, T2, T3, and T4 have collectors respectively connected to cathodes of their respective freewheeling diodes and emitters respectively connected to anodes of their respective freewheeling diodes;

an emitter of the T1 and a collector of the T2 are connected and used as an AC port A of the first submodule, a collector of the T1 and a positive electrode of the C1 are connected and used as a positive electrode port C of the first submodule, an emitter of the T2, a negative electrode of the C1, a collector of the T4, and a positive electrode of the C2 are connected and used as a port I of the first submodule, an emitter of the T4 and a collector of the T3 are connected and used as an AC port B of the first submodule, and an emitter of the T3 and a negative electrode of the C2 are connected and used as a negative electrode port D of the first submodule; the positive electrode port C and the negative electrode port D of the first submodule are respectively connected to a positive electrode port and a negative electrode port of the front stage of the DC/DC converter connected to a DC side of the module;

the second submodule comprises a DC capacitor C3, a DC capacitor C4, and five insulated gate bipolar transistors T5, T6, T7, T8, and T9 with anti-paralleled diodes;

the T5, T6, T7, T8, and T9 have collectors respectively connected to cathodes of their respective freewheeling diodes and emitters respectively connected to anodes of their respective freewheeling diodes;

in the second submodule, an emitter of the T5 and a collector of the T6 are connected and used as an AC port E of the second submodule, a collector of the T5 and a positive electrode of the C3 are connected and used as a positive electrode port G of the second submodule, an emitter of the T6, an emitter of the T9, and a negative electrode of the C3 are connected, an emitter of the T7 and a collector of the T8 are connected and used as an AC port F of the second submodule, a collector of the T7, a collector of the T9, and a positive electrode of the C4 are connected and used as a port J of the second submodule, and an emitter of the T8 and a negative electrode of the C4 are connected and used as a negative electrode port H of the second submodule; the positive electrode port G and the negative electrode port H of the second submodule are respectively connected to a positive electrode port and a negative electrode port of the front stage of the DC/DC converter connected to a DC side of the second submodule;

without considering redundancy, X+Y=N, (2X+2Y)Vc=Vdc, and vm=(2X+2Y)Vc, where Vdc is a voltage at a high-voltage DC side, Vc is a voltage of each DC capacitor, and vm is a phase voltage amplitude at a high-voltage AC side; considering redundancy, the following relationship needs to be satisfied: X+Y≥N; when the MMC has a DC fault ride-through capability, without considering redundancy, X and Y satisfy the following relationship:

$$\frac{\sqrt{3}}{2}(2X+2Y) \le 4Y;$$

in the same phase, the X first submodules, the Y second submodules and the inductor are successively connected in series to form an upper bridge arm of the phase, the inductor, the Y second submodules, and the X first submodules are successively connected in series to form a lower bridge arm of the phase, and a connection midpoint of the upper bridge arm and the lower bridge arm in the same phase is a high-voltage AC interface of the power electronic transformer in the phase;

positive electrode ends of three upper bridge arms are connected together and used as a positive electrode P of a high-voltage DC port of the power electronic transformer, negative electrode ends of three lower bridge arms are connected together and used as a negative electrode N of the high-voltage DC port of the power electronic transformer, and the DC side of each of the first submodules and the second submodules is connected to the front stage of each DC/DC converter;

the DC side of each submodule of the MMC is connected to a DC/DC converter, the DC side of the front stage of each DC/DC converter is connected to the positive electrode and the negative electrode of the DC capacitors connected in series in a corresponding module in the MMC, and positive electrodes and negative electrodes at DC sides of back stages of all the DC/DC converters are respectively connected in parallel and then connected to a positive electrode and a negative electrode at a DC side of the inverter.

2. The four-port power electronic transformer based on a hybrid MMC according to claim 1, wherein the high frequency transformation part of the DC/DC converter is a high frequency transformer T, and the back stage part consists of an H-bridge circuit and a DC capacitor.

3. The four-port power electronic transformer based on a hybrid MMC according to claim 1, wherein the front stage part of the DC/DC converter is of a full-bridge structure, the DC side of the front stage part of the DC/DC converter connected to the first submodule is connected to the port C and the port D of the first submodule, and the DC side of the front stage part of the DC/DC converter connected to the second submodule is connected to the port G and the port H of the second submodule.

4. The four-port power electronic transformer based on a hybrid MMC according to claim 1, wherein the front stage part of the DC/DC converter is of an improved diode clamping structure, comprising five insulated gate bipolar transistors T10, T11, T12, T13, and T14 with anti-paralleled diodes and two diodes D1 and D2, wherein a collector of the T10 is connected to the port C of the first submodule or the port G of the second submodule, an emitter of the T10 and a cathode of the D1 are connected to a collector of the T1, an anode of the D1, an emitter of the T14, a cathode of the D2 are connected to one end of the high frequency transformation part, a collector of the T14 is connected to the port I of the first submodule or the port J of the second submodule, an emitter of the T11 is connected to a collector of the T12 and the other end of the high frequency transformation part, an emitter of the T12 is connected to an anode of the D2 and a collector of the T13, and an emitter of the T13 is connected to the port D of the first submodule or the port H of the second submodule, wherein the T14 is in a turn-on state all the time when the power electronic transformer works normally, and when a DC fault occurs at a high-voltage side of the power electronic transformer, a trigger signal for the T14 is blocked; the insulated gate bipolar transistors T10, T11, T12, T13, and T14 with anti-paralleled diodes have the collectors respectively connected to cathodes of their respective freewheeling diodes and the emitters respectively connected to anodes of their respective freewheeling diodes.

5. The four-port power electronic transformer based on a hybrid MMC according to claim 2, wherein the front stage part of the DC/DC converter is of an improved T-type three-level structure, comprising three insulated gate bipolar transistors T15, T16, and T19 with anti-paralleled diodes and one reverse blocking insulated gate bipolar transistor consisting of T17 and T18, wherein a collector of the T15 is connected to the port C of the first submodule or the port G of the second submodule, an emitter of the T15, a collector of the T16, a collector of the T17, and an emitter of the T18 are connected to one end of the high frequency transformer T, an emitter of the T17, a collector of the T18, and an emitter of the T19 are connected to the other end of the high frequency transformer T, a collector of the T19 is connected to the port I of the first submodule or the port J of the second submodule, and an emitter of the T16 is connected to the port D of the first submodule or the port H of the second submodule; the insulated gate bipolar transistors T15, T16, T17, T18, and T19 with anti-paralleled diodes have the collectors respectively connected to cathodes of their respective freewheeling diodes and the emitters respectively connected to anodes of their respective freewheeling diodes; the T19 is in a turn-on state all the time when the power electronic transformer works normally, and when a DC fault occurs at a high-voltage side, a trigger signal for the T19 is blocked.

6. The four-port power electronic transformer based on a hybrid MMC according to claim 1, wherein a modulation ratio m of the MMC satisfies the following relationships: m≤2 and $m=2v_m/V_{dc}$.

* * * * *